United States Patent [19]

Plouffe et al.

[11] 4,281,358
[45] Jul. 28, 1981

[54] MULTIFUNCTION DYNAMOELECTRIC PROTECTION SYSTEM

[75] Inventors: Leo A. Plouffe, North Dighton; Diethard Unterweger, Plainville, both of Mass.

[73] Assignee: Texas Instruments Incorporated, Dallas, Tex.

[21] Appl. No.: 939,087

[22] Filed: Sep. 1, 1978

[51] Int. Cl.³ .............................................. H02H 7/08
[52] U.S. Cl. ...................................... 361/22; 361/27; 361/24; 361/106
[58] Field of Search ...................... 361/22, 23, 24, 27, 361/25, 28, 29, 92, 106, 86, 87, 196, 198, 195

[56] References Cited

U.S. PATENT DOCUMENTS

| | | |
|---|---|---|
| 3,500,074 | 3/1970 | Obenhaus . |
| 3,549,942 | 12/1970 | Nijholt .............................. 361/196 X |
| 3,740,613 | 6/1973 | Strachan . |
| 3,753,043 | 8/1973 | Plouffe .............................. 361/22 X |
| 3,794,858 | 2/1974 | Squiers . |
| 3,879,639 | 4/1975 | Sircom et al. ........................ 361/87 |
| 3,909,675 | 9/1975 | Hirsbrunner . |
| 4,038,061 | 7/1977 | Anderson et al. .................. 361/22 X |
| 4,042,966 | 8/1977 | Newell .............................. 361/27 |
| 4,075,674 | 2/1978 | Squiers et al. ....................... 361/27 |
| 4,084,406 | 4/1978 | Brenneman ........................ 361/22 X |

*Primary Examiner*—Patrick R. Salce
*Attorney, Agent, or Firm*—John A. Haug; James P. McAndrews; Melvin Sharp

[57] ABSTRACT

A protection system for a dynamoelectric machine providing a plurality of protective functions comprises a module having as a first function over temperature protection including thermal sensors adapted to be placed in heat transfer relation with the windings of the machine. The sensors which may be connected in series or in parallel are connected to a sensing circuit provided with shorted sensor protection. When connected in parallel a channel is provided for each sensor and is isolated from one another. Other functions include a minimum off delay timer which prevents rapid cycling of the machine. An oil pressure timer particularly useful with a compressor motor to sense oil pressure between the output of the oil pump and the crankcase in order to deenergize the motor should there be inadequate oil pressure for a selected period of time, a low voltage cut out network in the event of the occurrence of low voltage conditions, and a circuit to facilitate use of controls in the output side of the system if desired while permitting operation of the system only on the condition of output current flow.

The minimum off delay timer can be modified to provide a manual reset circuit which will lock out or prevent energization of the machine each time the protection circuit is tripped. Reset can be accomplished only by removing power to the module and reapplying said power.

28 Claims, 4 Drawing Figures

MULTIFUNCTION DYNAMOELECTRIC PROTECTION SYSTEM

This invention relates to a protection system for dynamoelectric machines and more particularly to a multifunction protection system for such machines.

Systems for protecting motors and the like from over temperature conditions comprising one or more thermal sensors disposed in heat transfer relationship with the windings of the motor are well known in the prior art. One particularly effective system is set forth in U.S. Pat. No. 3,909,675 which issued on Sept. 30, 1975. In this system an all solid state protection circuit utilizes positive temperature coefficient (PTC) of resistivity sensors which are responsive to temperature change in which each PTC sensor forms part of a bridge circuit which in turn is adapted to control the operation of a switch. When an overtemperature condition occurs the change in resistance of a sensing PTC sensor unbalances the bridge and operates the switch thereby deenergizing the motor or other protected device.

While the above described system has proven to be highly effective there has been a need to provide not only over temperature protection but also to provide functions which will protect various apparatus from the occurrence of additional conditions in an economical and efficient manner. For example, once the supply of power to the load is interrupted, either through the sensing of an overtemperature condition by the PTC sensors and concomitant tripping of the protection circuit, the opening of a contactor or for any other reason, it is undesirable to permit the reapplication of power to certain loads, such as air conditioner compressors, until after a certain period of time passes thereby permitting the load to return to a condition suitable for reenergization. In the case of compressors a short time delay allows equalization of pressure in the compressor so that less starting torque is required. A suitable off delay timer circuit which supplements and interacts with the above described temperature protection circuit is shown in U.S. Pat. No. 3,794,858 which issued Feb. 26, 1974.

In addition to the provision of the off-delay function it is frequently desirable to include other functions which will cooperate and interact with the basic temperature protection circuit to provide more complete protection for certain loads. In the case of compressor motors, for instance, it would be desirable to include oil pressure protection to ensure that the system is not operated when the oil pressure falls below a safe value for more than a selected time interval. Another desirable function would be the provision of low voltage protection to avoid the possibility of having one phase of the motor drop out which would cause overworking of the remaining phases.

In accordance with the present invention the temperature sensing circuit includes one or more channels each comprising a PTC sensor connected to a reference resistor in a voltage divider which is coupled to a first voltage comparator. Once the refernece voltage at the comparator is exceeded due to a change in sensor resistance, the output of the comparator will switch and, through a second comparator will turn off a triac. Negative feedback is provided for the first comparator to prevent oscillation and to provide hysterises so that there will be a temperature differential between deenergization and reenergization of the load. Shorted sensor protection is provided by sensing the voltage across the sensors using the second comparator which will turn off the triac when the resistance across a sensor approaches zero.

The output comprises a transistor controlled by the second comparator and coupled to and controlling the energization of a reed coil. The reed contact is disposed in the gate circuit of the above referenced triac which energizes a contactor for the load. This arrangement provides isolation between the input and output circuits.

The minimum off delay timer employs a capacitor which cooperates with a third comparator. When power is interrupted the output of the comparator will switch high due to the charge retained by the capacitor. This output signal is fed back to the first comparator to keep the triac in the tripped mode. Once the capacitor discharges the output of the third capacitor switches low and the circuit is free to reset assuming other conditions are satisfactory.

A low voltage cut out circuit is arranged to turn off the output when the input voltage to the module decreases below a selected level. Alternating current voltage from the system input is rectified and filtered to obtain a d.c. level at the input of a comparator. If the a.c. voltage drops, a filter capacitor will briefly maintain the voltage level at the input of the comparator above the reference level thus providing a short delay before the triac is turned off and avoiding nuisance tripping. Once the voltage level drops below the reference voltage the output of the comparator will switch and cause the system to trip. The system automatically resets once the minimum off timer has timed out and the proper a.c. voltage levels have been restored.

The oil pressure timer utilizes a pressure sensing switch to sense the pressure between the output of an oil pump and the crankcase of a compressor. When power is applied, a capacitor charges within a specified time; however, if sufficient oil pressure develops before the charge in the capacitor reaches a selected level, the contacts of the pressure switch close and discharge the capacitor. If sufficient oil pressure does not develop by that time, the voltage at a fourth comparator, coupled thereto, will exceed a reference voltage and cause the output of this comparator to switch low. This signal is fed back to the second comparator which will in turn trip the triac. The capacitor is arranged so that it will effectively maintain its charge until it is manually discharged by depressing a reset button. If the system is tripped due to excessive winding temperature, the capacitor is discharged through the first comparator to insure a fresh timing cycle when power is reapplied.

In view of the fact that all of the above referenced functions respond to signals at the input or sensor side of the circuit and since the input and output of the circuit are electrically isolated from one another means are provided to sense current flow in the output circuit and permit operation of the several functions only if current is flowing through the triac so that the circuit can be employed with controls in the output circuit if desired. That is, if contacts placed in series with the triac are opened the load will be deenergized but functions such as the oil pressure timer and the minimum off delay timer would not respond since the triac output is still closed. This would result in a lock out of the system since oil pressure could not develop because of the deenergization of the compressor. The output current flow is sensed by a torroidal transformer whose secondary is fed into a comparator. With the triac circuit energized but no current flow, the comparator's output will be high which keeps the oil pressure timing capacitor discharged. If current flows through the triac, the output of the comparator is low thereby enabling the oil pressure circuit to start timing. If a contact in series with the system output is opened a pulse is generated which is fed into the shorted sensor protection circuit which turns off the triac and actuates the minimum off delay timer.

If desired, the minimum off delay timer can be modified to provide a manual reset circuit so that the system will lockout any time the output trips. When this happens the triac will not reset until power to the system is removed and then reapplied. This is accomplished by providing positive feedback from the output to an input of the minimum off delay comparator to keep the minimum off delay capacitor charged as long as power is applied thereby keeping the output of the comparator high. Since this output is fed back to the temperature sensing circuit it locks out the triac until power is removed permitting the capacitor to discharge and thus resetting the system.

It is therefore an object of this invention to provide a system which not only protects a dynamoelectric machine from overtemperature conditions but also one which includes additional functions. It is an object of the invention to provide a high reliability, cost effective solid state circuit system which will protect a dynamoelectric machine, particularly a compressor motor, from a plurality of conditions including over temperature, low voltage, low oil pressure and too rapid cycling of the motor. Yet another object is to provide a motor protection system which can be used with controls in the input or output of the system. Still another object is the provision of a protection system which is either automatically or manually resettable. A further object is to provide a protection circuit having several functions which cooperate with one another to ensure more complete protection of the protected device.

The above objects and still further objects of the invention will become apparent to those skilled in the art after consideration of the following preferred embodiments thereof, which are provided by way of example and not by way of limitation wherein.

Figure 1:
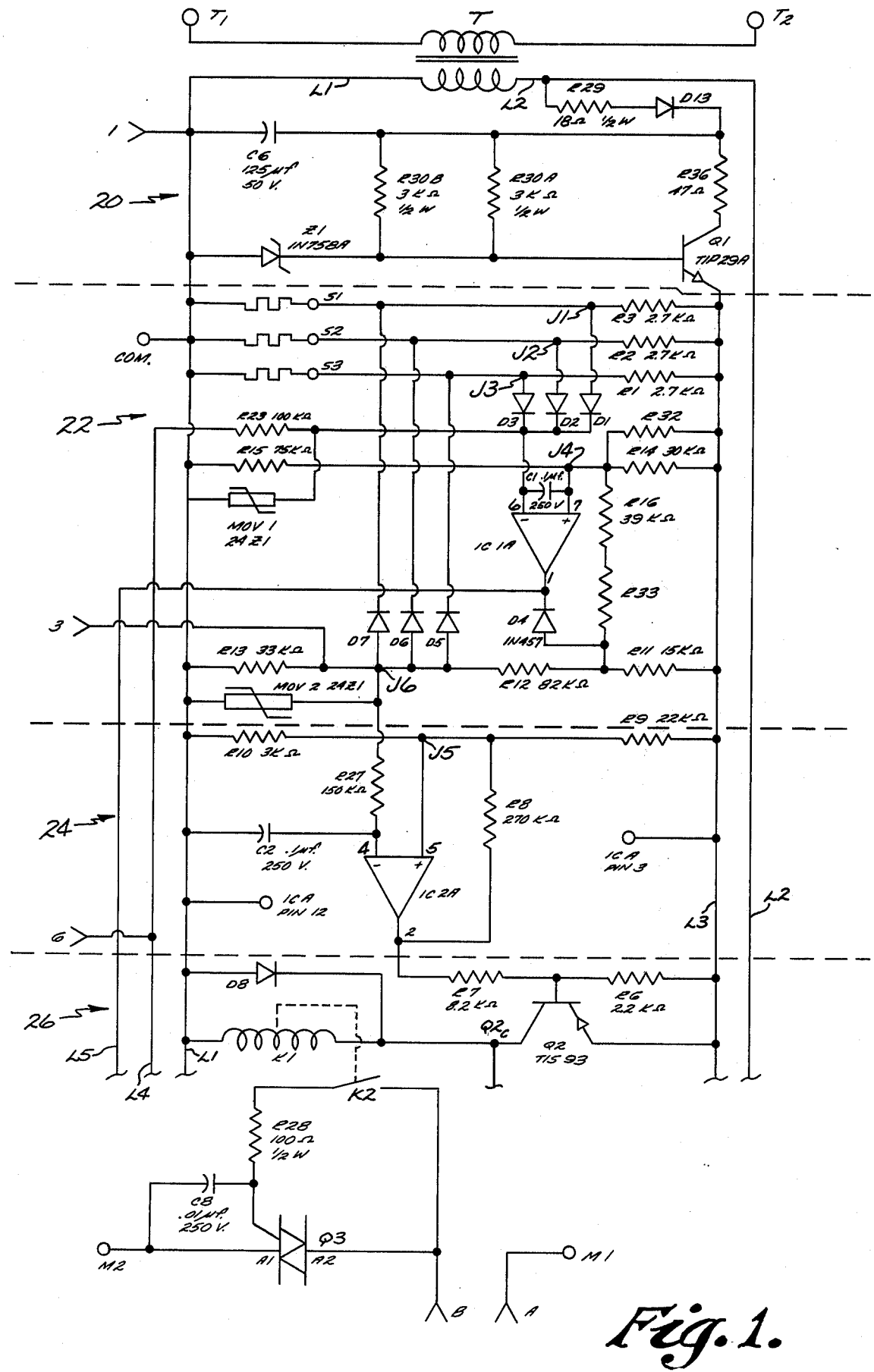
FIG. 1 is a schematic circuit diagram of a portion of a protection system for dynamoelectric machines made in accordance with a first embodiment of the invention comprising the functions of the power supply, temperature protection, shorted sensor protection and output.
Figure 1A:
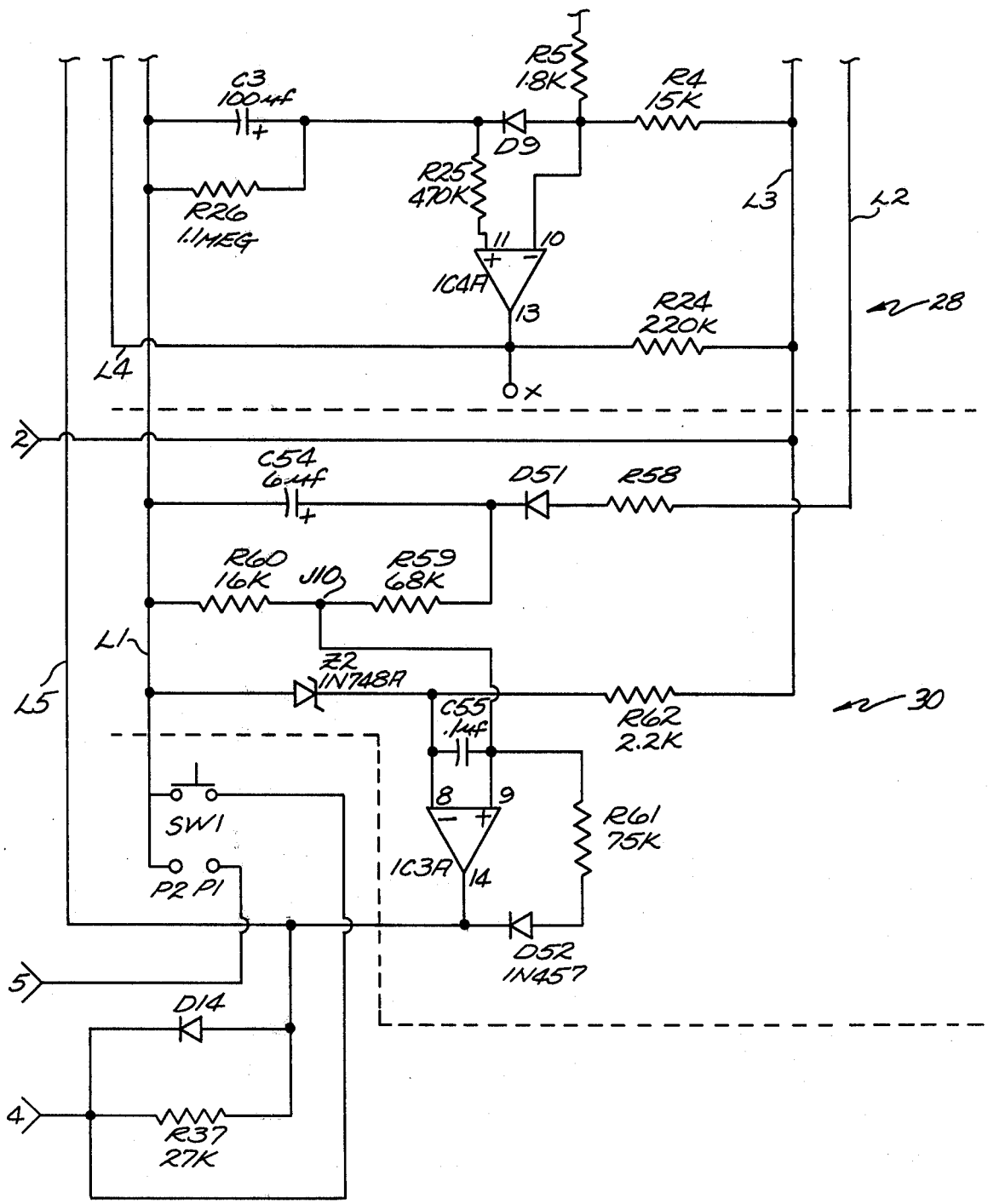
FIG. 1a is a schematic circuit diagram of another portion of the protection system made in accordance with the first embodiment of the invention comprising the functions of minimum off-delay and low voltage detection.
Figure 1B:
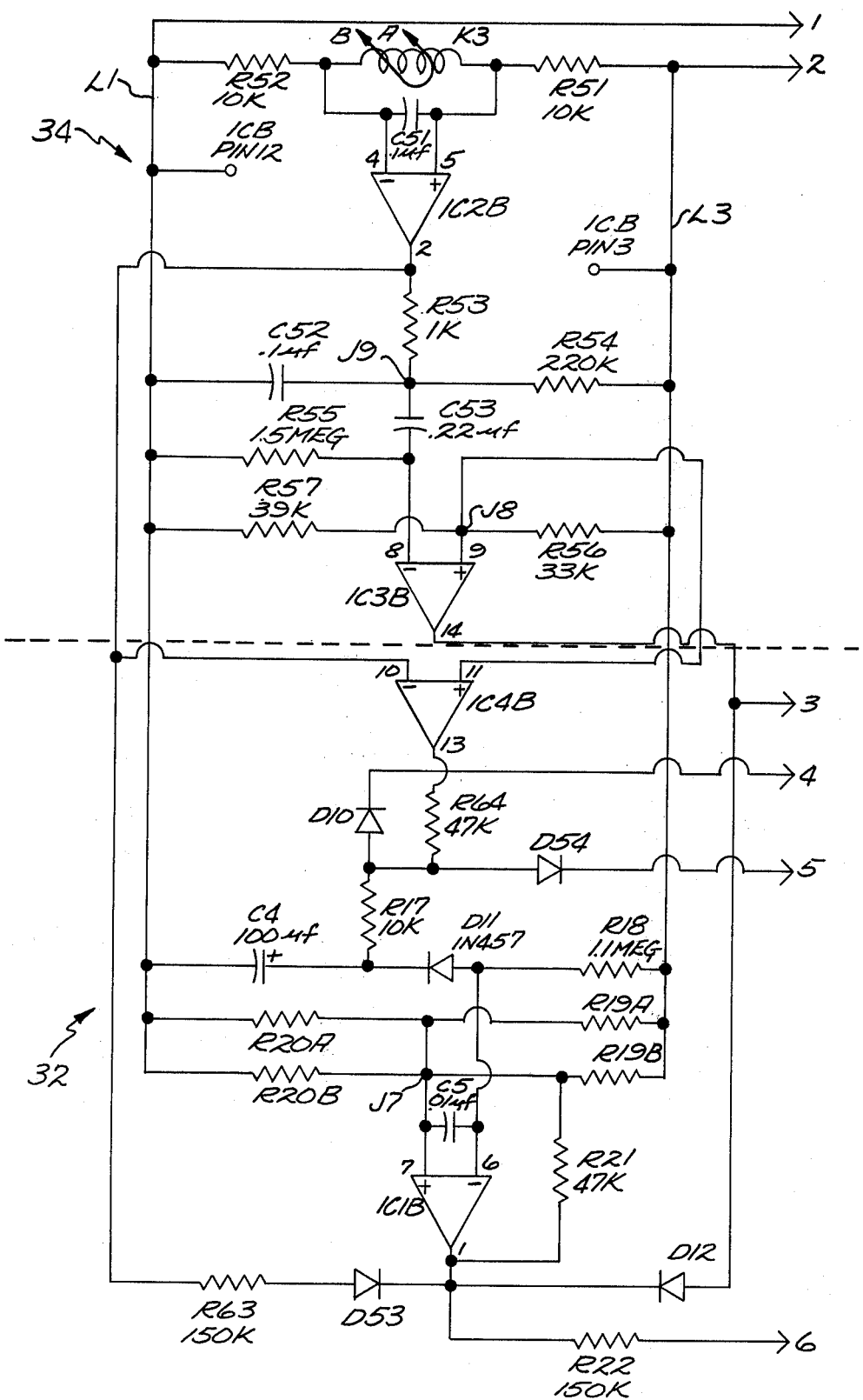
FIG. 1b is a schematic circuit diagram of yet another portion of the protection system made in accordance with the first embodiment of the invention comprising the functions of output sensing and oil pressure protection.

Referring to FIGS. 1, 1a and 1b, there is shown a protection system providing a number of separate functions which interact and cooperate with one another to provide improved protection of a dynamoelectric machine particularly those used as air conditioning compressor motors. While the system of the present invention has utility with other dynamoelectric machines it will be appreciated that due to the features the system provides, such as low voltage and oil pressure protection it is especially useful with compressor motors. The system is such that a first circuit board conveniently includes the power supply, thermal protection, shorted sensor protection, the output, minimum off-delay and low voltage detection. A second circuit board which may conveniently be mounted directly above the first board includes output detection and oil pressure protection. Interconnecting pins 1–6 interconnect the two boards to one another. The two boards may be disposed in a suitable housing (not shown) such as one made of glass reinforced Lexan with an aluminum base plate which can serve as a heat sink for a triac which serves as a power switching device. A plurality of quick connect terminals may be provided for the various required connections with outside sensors and the like.

More specifically, as seen in FIG. 1, the power supply circuit 20 includes a transformer T whose primary is connected to terminals T1, T2. The secondary of transformer T is connected by L1 to common and L2 to a half wave rectifier comprising a current limiting resistor R29 which is serially connected to the anode of rectifier diode D13. The cathode of diode D13 is connected to the collector of NPN transistor Q1 through resistor R36 and to capacitor C6 which in turn is connected to common. Parallel resistors R30A and R30B are connected between the cathode of diode D13 and the base of transistor Q1. A zener diode Z1 is connected between the base of transistor Q1 and common.

The transformer is used to decrease the outside supply voltage, which may be for instance 120 or 240 volts down to 24 volts which is the selected level for operation of the system of the instant invention. Resistor R29 limits current into capacitor C6 on initial start up to a level which is acceptable for diode D13.

Capacitor C6 smooths out the half wave which is regulated to 10 volts by resistor R30A, R30B, zener diode Z1 and transistor Q1.

The temperature protection circuit 22 comprises a bridge circuit which includes temperature dependent resistors in the form of positive temperature coefficient (PTC) of resistivity sensors which are buried in the windings of the dynamoelectric machine. When an over temperature condition is detected by one or more of the sensors through a change in resistance, the electronic circuit trips turning off a triac which in turn deenergizes the contactor coil circuit of the dynamoelectric machine.

The bridge circuit comprises voltage dividers S1, R3, S2, R2 and S3, R1 connected in parallel across the regulated power supply L3 and common L1. Junction J1, J2 and J3 of these voltage dividers are connected to the negative input pin 6 of voltage comparator IC1A. The voltage dividers are isolated from one another by diodes D1, D2 and D3, whose anodes are connected to respective junctions and cathodes to pin 6. A reference voltage is provided at the positive pin 7 of comparator IC1A by connecting thereto junction J4 of a voltage divider comprising R14 and R15 connected across the regulated power supply and common. Feedback resistor R16 is connected between the output pin 1 of comparator IC1A and the positive input pin 7. Diode D4 is coupled between resistor R16 and pin 1 with its cathode connected to pin 1 for a purpose to be described infra. Capacitor C1 is connected across the input pins of the comparator and serves as a high frequency noise suppressor.

During normal operation of the dynamoelectric machine the voltage at pin 7 of the voltage comparator will exceed that of pin 6 and the output of the comparator will be high, however, when one or more of the sensors goes into its high resistance mode due to an increase in temperature to an alarm level, the voltage at pin 6 will exceed that of pin 7 and the comparator will switch low. Upon switching low the feedback resistor R16 is essentially connected to ground and in effect is connected in parallel with resistor R15 to thereby decrease the effective resistance and provide differential for switching the comparator back to its high state. Thus the temperature of the windings of the dynamoelectric machine must cool down to a substantially lower temperature than the alarm level before the comparator will switch to its high state.

Rather than employing the PTC sensors in a parallel circuit configuration it may be preferred to connect several sensors in series and use a single channel. In this event an additional feedback resistor R33 is serially connected to resistor R16 and an additional reference resistor R32 is connected across resistor R14 in order to adjust the trip and reset levels as desired.

The shorted sensor protection circuit 24 comprises voltage comparator IC2A whose positive input pin 5 is connected to junction J5 of a reference voltage divider comprising resistors R9, R10 connected across the regulated power supply and common. The negative input pin 4 of comparator IC2A is connected through resistor R27 to junction J6 of a voltage comparator comprising resistors R12 and R13 which are serially connected to resistor R11 across the regulated power supply and common. Feedback resistor R8 is connected between output pin 2 of comparator IC2A and its positive input pin 5 to provide differential upon switching and thereby prevent possible oscillation in the same manner as feedback resistor R16 with comparator IC1A. Capacitor C2 is connected between pin 4 of comparator IC2A and common. The anodes of diodes D5, D6 and D7 are connected to junction J6 while their respective cathodes are connected to junctions J3, J2 and J1.

Output circuit 26 includes PNP transistor Q2 which has its emitter connected to the regulated power supply and its collector to a reed switch coil K1 which in turn is connected to common. A conventional free wheeling diode D8 is connected across coil K1 to prevent deleterious effects to transistor Q2. The base of transistor Q2 is connected intermediate biasing resistors R6 and R7 connected between the regulated power supply and the output pin 2 of comparator IC2A. The reed contacts K2 which are operably controlled by coil K1 and provide isolation between the input and output of the system are disposed in the gate circuit of triac Q3. The gate circuit also includes resistor R28 connecting the gate of triac Q3 with anode A2 and capacitor C8 connected between its gate and anode A1. The anodes A1, A2 of triac Q3 are connected between M1 and M2 which is the contactor coil circuit of the dynamoelectric machine.

When the output of comparator IC1A is low which would occur when one of the temperature sensors is in its high resistance state as explained supra, it pulls down the voltage between resistors R11 and R12 which then lowers the input to pin 4 to a level lower than the reference voltage at pin 5 and causes comparator IC2A to switch high thereby shutting off transistor Q2 and causing contacts K2 to open deenergizing triac Q3.

Should a short circuit occur across one of the sensors S1, S2 or S3 due to stripping of the lead wires, being crushed in the winding or for any other reason pin 4 will be pulled to ground through the respective diode D5, D6 or D7 which will then cause the output of comparator IC2A to switch high and turn off the system.

Transient protection is provided for positive transients by means of metal oxide varistor MOV1 which is connected between pin 6 of comparator IC1A and common while negative transients protection is provided by metal oxide varistor MOV2 connected between junction J6 and common.

Resistor R27 and capacitor C2 form a timing circuit for a purpose which will be explained below in connection with the oil pressure circuit.

A minimum off-delay circuit 28 is provided to prevent rapid cycling of the dynamoelectric machine by assuring an off delay of a selected interval each time the triac has been turned off for any reason. Circuit 28 includes voltage comparator IC4A whose negative input pin 10 is connected to the regulated power supply through resistor R4 and to the collector Q2c of transistor Q2 through resistor R5. Positive pin 11 of comparator IC4A is connected through resistor R25 to capacitor C3 which in turn is connected to common. Resistor R26 is coupled across capacitor C3. The anode of diode D9 is connected to input pin 10 with its cathode connected to pin 11 through resistor R25. The output 13 of comparator IC4A is connected to the regulated power supply through resistor R24 and input pin 6 of temperature protection comparator IC1A through resistor R23 via line L4. Output 13 is also connected to interconnect pin 6 for a purpose to be described below.

When power is applied to the system capacitor C3 charges up to approximately 10 volts with pin 10 of comparator IC4A being one diode drop above pin 11. Under this condition the comparator output pin 13 is low thereby allowing operation of the dynamoelectric machine. Upon tripping of the circuit, or should power be removed therefrom, the voltage level at pin 10 drops to approximately 2 volts. When transistor Q2 shuts off a voltage divider is formed with resistor R4 in the upper leg and resistor R5 and coil K1 in the lower leg. The resistance of R4 is substantially higher than R5 and K1 resulting in the 2 volt level at pin 10. Due to the charge on capacitor C3 pin 11 of comparator IC4A is now positive with respect to pin 10 and the output will switch to high. This signal is fed back to input pin 6 of the temperature comparator IC1A thereby maintaining triac Q3 in the tripped or off mode. Once tripped, capacitor C3 slowly discharges through resistor R26 until the voltage at pin 11 again becomes negative with respect to pin 10 when the output of comparator IC4A will switch low and permit operation of the load assuming that the temperature of sensors S1, S2 and S3 are all below their reset level.

Resistor R25 prevents discharge of capacitor C3 through pin 11 in the event that the power supply to the circuit is removed and thereby maintains the reset timing at the selected period.

Another problem to be guarded against is low voltage which can be caused by single phase conditions in the primary power supply. If the voltage falls low enough the contactor may drop out removing the load from the line however due to the change in load current the voltage can then increase sufficiently to reenergize the contactor. This cycle then tends to repeat itself and can cause welding of the contacts and concomitant loss of protection of the load. Even if the contacts do not weld the stresses introduced by contact chatter may be fatal to the load.

In order to obviate this problem low voltage detector circuit 30 is provided which operates to protect the load in conjunction with the minimum off delay circuit 28. Low voltage detector circuit 30 comprises voltage comparator IC3A whose negative input 8 is connected to a reference voltage means provided by zener diode Z2 whose anode is connected to common and whose cathode is connected to pin 8 and to resistor R2 which in turn is connected to the regulated power supply. Positive pin 9 of comparator IC3A is connected to junction J10 of a voltage divider comprising resistors R59 and R60. Resistor R60 is connected to ground while resistor R59 is connected to the cathode of rectifier diode 51 whose anode is connected through a resistor R58 to line L2. Capacitor C54, smooths out any ripple from the rectified voltage wave, is coupled across resistors R59 and R60. Feedback resistor R61 is connected between input pin 9 of comparator IC3A and its output pin 14 through diode D52 with the cathode connected to pin 14. Output pin 14 is also connected to output pin 1 of the temperature protection comparator IC1A. Capacitor C55 is connected across input pins of comparator IC3A to obviate transient problems.

Should the input voltage from the transformer fall below a level selected by the value of resistor R58 the voltage at pin 9 of comparator IC3A will fall below that of pin 8 and cause the output of the comparator to switch low which pulls down pin 1 of temperature protection comparator IC1A and trips the circuit. Once the circuit is tripped the minimum off delay will prevent reenergization for the selected delay period. Since capacitor C54 is charged up to a level dependent upon the particular input voltage from transformer T the capacitor will maintain the charge at pin 9 above that of pin,8 for brief periods of low supply voltage thereby avoiding nuisance tripping of the circuit. Diode D52 prevents feedback of high voltage from pin 1 of temperature protection comparator IC1A to the low voltage detector. It should be noted that since temperature has opposite effects on zener diode Z2 and diode D52, effects due to temperature changes are essentially concalled out thereby providing temperature stability for the circuit.

Also mounted on the basic circuit board pressure switch contacts P1 and P2 are connected between interconnect pin 5 and common. A manual reset button SW1 is connected between ground and interconnect pin 4. Interconnect pin 4 is connected through resistor R37 to output pin 14 of comparator IC3A as well as output pin 1 of the temperature protection comparator. Diode D14 is coupled across resistor R37 with its cathode connected to interconnect pin 4.

As seen in FIG. 1b a supplementary circuit board mounts thereon oil pressure circuit 32 and output sensing circuit 34. The main board can be used independently or if the additional functions of oil pressure protection and output sensing are desired the supplementary board can be used since it cooperates with the main board to provide the desired protection. The supplementary board is conveniently mounted over the main board and is electrically connected thereto by means of interconnection pins 1-6.

Oil pressure circuit 32 comprises voltage comparators IC1B and IC4B. A reference voltage is fed to positive pin 7 of comparator IC1B by connecting it to junction J7 of a voltage divider comprising interconnected resistors R19B and R20B connected between the regulated power supply and common and, if desired for reasons to be explained below, parallel connected divider comprising resistors R19A and R20A. Negative input pin 6 of comparator IC1B is connected to resistor R18 which is in turn connected to the regulated power supply. The anode of diode D11 is connected to pin 6 while its cathode is connected to capacitor C4 which in turn is connected to common. A feedback resistor R21 is connected between output pin 1 of comparator IC1B and its positive input pin 7.

Comparator IC4B has its positive input pin 11 connected to junction J8 of a voltage divider comprising resistors R56 and R57 interconnected between the regulated voltage supply and common and its negative input pin 10 connected to the output of comparator IC1B through resistor R63 and diode D53. Output pin 1 of comparator IC1B is connected to the cathode of diode D53 and to interconnect pin 6 through resistance R22. The output of comparator IC4B is connected through a resistor R64 and diode D54 to interconnect pin 5 with the cathode of D54 connected to pin 5. The cathode of diode D11 is connected through resistor R17 to resistor R64 and to the anode of diode D10 whose cathode is connected to interconnect pin 4. The output pin 1 of comparator IC1B is connected to the cathode of diode D12 whose anode is connected to interconnect pin 3 and to the output pin 14 of comparator IC3B. Interconnect pin 3 in the main board is connected to junction J6.

The oil pressure circuit operates to shut off the load in the event that insufficient pressure is developed by the pump a predetermined period of time after energization of the load or if oil pressure is lost for that period of time during operation. The voltage dividers formed by resistors R19A, R20A and R19A, R20A provide a reference voltage at pin 7 of comparator IC1B. Feedback resistor R21 prevents oscillation in the same manner as described above with reference to comparator IC1A, IC2A and IC3A. When power is initially applied pin 7 of comparator IC1B will be at the reference voltage while capacitor C4 slowly charges up through resistor R18. When the voltage on pin 6 exceeds the reference voltage the output of the comparator will switch low which will pull down input pin 4 of comparator IC2A through interconnect pin 3 to shut down the system. Once the oil pressure circuit trips the system it will maintain it in the tripped position until manually reset due to the charge on capacitor C4 which is prevented from discharging through R18 by diode D11. The other discharge path of capacitor C4 is through resistor R17 and interconnect pin 5 to pressure contacts P1, P2 which are open when the pressure is insufficient and interconnect pin 4 either through resistor R37 to ground or manual reset switch SW1. Therefore, capacitor C4 cannot discharge except through the combined resistance of R17 and R37 unless manual reset switch SW1 is depressed. Diode D4 prevents discharge of capacitor C4 in the event that power is completely removed from the circuit so that the system can not be reset for an extended period of time, for instance in the order of fifteen minutes.

In the event that the system is tripped due to an excessive temperature condition, means are provided to ensure that the time required to charge capacitor C4 remains constant by discharging the capacitor back to common each time the system is tripped by means other than lack of oil pressure. This is accomplished through resistor R17, diode D10 and resistor R37 which feeds into pin 1 of comparator IC1A. As described above anytime that pin 1 goes low it pulls pin 4 of comparator IC2A low shutting off the system. When pin 1 is low it discharges capacitor C4 through resistor R17, R37. Thus comparator IC1A will not only trip the system but it will also discharge capacitor C4. Resistance of R17, R37 limits the current and prevents an instantaneous surge to common.

The pressure switch (not shown) used with the system is a normally open switch which will close and bridge contacts P1, P2 when subjected to a selected amount of pressure. Thus when the system is first energized contacts P1, P2 are open since there is inadequate pressure developed by the compressor pump. Capacitor C4 starts to charge at the same time the pressure builds up. Normally the oil pressure switch will close within a fairly short period of time, for instance in a minute or so. The charging time of capacitor C4 is chosen to be somewhat longer than this, for instance two minutes so that the capacitor is shorted through resistor R17, diode D54 through contacts P1, P2 to common preventing comparator IC1B from switching.

When pin 6 exceeds pin 7 of comparator IC1B and trips the system the output of the comparator switches low and in effect places resistor R21 in parallel with R20A, R20B to provide feedback and pull down pin 4 of comparator IC2A through diode D12. This causes the output of IC2A to switch high and shut the system down. As long as pin 1 of comparator IC1B is low the circuit will be deenergized.

Diode D12 prevents feedback voltage into pin 4 of comparator IC2A which would lock the system on.

Although, as described above it is desired to discharge capacitor C4 each time the system is tripped for reasons other than a lack of sufficient oil pressure, it is also necessary to prevent capacitor C4 from discharging when the system is tripped by the oil pressure circuit. That is, under such conditions it is desirable to lock out the system. This is accomplished by resistors R22, R23 and R24. Since the minimum off-delay circuit 28 feeds back into the temperature protection circuit, pin 6 of comparator IC1A, any time circuit 28 trips pin 1 of comparator IC1A goes low which would ordinarily discharge capacitor C4. When pin 1 of comparator IC1B goes low upon tripping due to lack of oil pressure, a voltage divider is formed between resistors R24 and R22 so the voltage through resistor R23 into pin 6 of comparator IC1A can never exceed pin 7 thereby keeping the output of comparator IC1A high. That is the voltage at the junction of resistors R22 and R24 is kept low. The system is maintained in the tripped condition because the oil pressure circuit 32 feeds directly into pin 4 of comparator IC2A keeping its output high and transistor Q2 off.

Thus tripping of the oil pressure circuit 32 will lock out the system and as long as capacitor C4 remains high the system cannot turn on. The system must be reset by depressing manual reset button SW1 to discharge the capacitor C4.

In order to prevent bypassing oil pressure circuit 32 by jamming the manual reset switch SW1 in the closed position capacitor C4 is connected (through resistor R17, diode D10 and resistor R37) to pin 1 of the temperature protection comparator. If switch SW1 is kept closed to keep capacitor C4 discharged it also pulls down pin 1 of comparator IC1A and keeps the system off. With this trip free feature as long as the button of SW1 is depressed the load cannot be energized. During operation of the system when the oil pressure switch closes bridging contacts P1, P2 and discharging capacitor C4 through resistor R17 and diode D54, diode D10 is back biased so it does not affect the output of the temperature protection comparator.

As mentioned supra comparator IC1B has an input connected to junction J7 of two parallel connected dividers comprising resistors R19B, R20B and R19A, R20A. This arrangement facilitates calibration of the circuit to ensure that the timing period for the oil pressure timer is within required limits. If the timing is too long resistor R19B can be conveniently cut out whereas if it is too short resistor R20B can be cut out.

In certain instances it may be desirable to place a redundant control in the power supply line to the load in series with triac Q3. Due to the isolation between input and output the protection circuit described thus far does not sense or respond to signals occurring in the output circuit. That is, if contacts K2 are closed the circuit will function as if the motor is energized whether or not the redundant control is closed. For this reason output sensing circuit 34 is provided to actuate the several functions of the protection circuit only if current flows through the triac Q3.

Output sensing circuit 34 comprises voltage comparators IC2B and IC3B. Resistors R51 and R52 are connected to opposite ends of coil K3. Resistor R52 is connected to common through interconnect pin 1 while resistor R51 is connected to the regulated power supply through interconnect pin 2. Positive input pin 5 of comparator IC2B is connected to the high voltage side of coil K3 while pin 4 is connected to the low voltage side thereof with noise suppressor capacitor C51 coupled across input pins 4 and 5. Output pin 2 is connected to negative input pin 10 of the oil pressure comparator IC4B and to the output of the oil pressure comparator IC1B through resistor R63 and diode D53. Positive pin 9 of comparator IC3B is connected to junction J8 to provide a reference voltage while negative input pin 8 is connected to common through resistor R55 and to one electrode of capacitor C53. The other electrode of capacitor C53 is connected to junction J9 between resistor R54, resistor R53 and capacitor C52. The other side of resistor R54 is connected to the regulated power supply, resistor R53 to output pin 2 of comparator IC2B and capacitor C52 to common. Output pin 14 of comparator IC3B is connected to interconnect pin 3 and to output pin 1 of comparator IC1B through diode D12. Line AB, which forms a part of the power supply to the load forms the primary of a torroidal transformer while coil K3 serves as the secondary so that when alternating current flows through section AB, and hence through the load, it is sensed by comparator IC2B. With such current flow the voltage at positive input pin 5 of comparator IC2B will be higher than negative input pin 4 causing the output of the comparator to be high for one half a cycle and on the other half cycle the voltage at negative input pin 4 will be higher than input pin 5 and the output of the comparator will be low so that the result is square wave output. When there is no current flow in line AB the voltage at input pin 5 is always slightly higher than at input pin 4 and so the output of comparator IC2B stays high. These two different signals are differentiated in the following manner. As comparator IC2B goes high it will start to charge capacitor C52 through resistance R54. As soon as pin 2 goes low again on the next half cycle junction J9 is pulled down to common resulting in a sawtooth type of wave form which is coupled to negative input pin 8 of comparator IC3B through capacitor C53. The peak of the sawtooth wave is always lower than the reference voltage at input pin 9 so that the output of comparator IC3B will stay high and will not affect the operation of comparator IC2A.

Should the load be deenergized through the redundant contactor and hence should no current flow in line AB, the voltage is still on for the protection circuitry. Once there is no current flow in line AB the voltage at pin 5 of comparator IC2B will stay higher than pin 4 so capacitor C52 will charge exponentially. Since junction J9 is coupled to pin 8 of comparator IC3B through capacitor C53 there is a brief pulse that is fed to pin 8 which exceeds the voltage at pin 9 causing the output of comparator IC3B to turn low. This then pulls down junction J6 and pin 4 of comparator IC2A switching its output high thereby shutting down the system which will remain deenergized at least as long as minimum off delay circuit 28 requires.

Capacitor C53, since it acts as an open circuit between junction J9 and input pin 8 once steady state conditions are achieved serves to reset the system. That is, without capacitor C53 the output of comparator IC3B would stay low keeping the output of comparator IC2A high and the system would be locked out.

ICA pins 3 and 12 on the lower circuit and ICB pins 3 and 12 on the upper board provide the power connections for the comparators on the respective boards.

Should the oil pressure circuit time out the system will trip and lock out until it is manually reset by depressing and releasing switch SW1. This trip free function is accomplished by using the output signal of comparator IC1B to disable both comparators IC2A and IC4B. As long as power is applied to the system capacitor C4 will retain its charge and lock out the system until the reset button is pushed.

Figure 2:
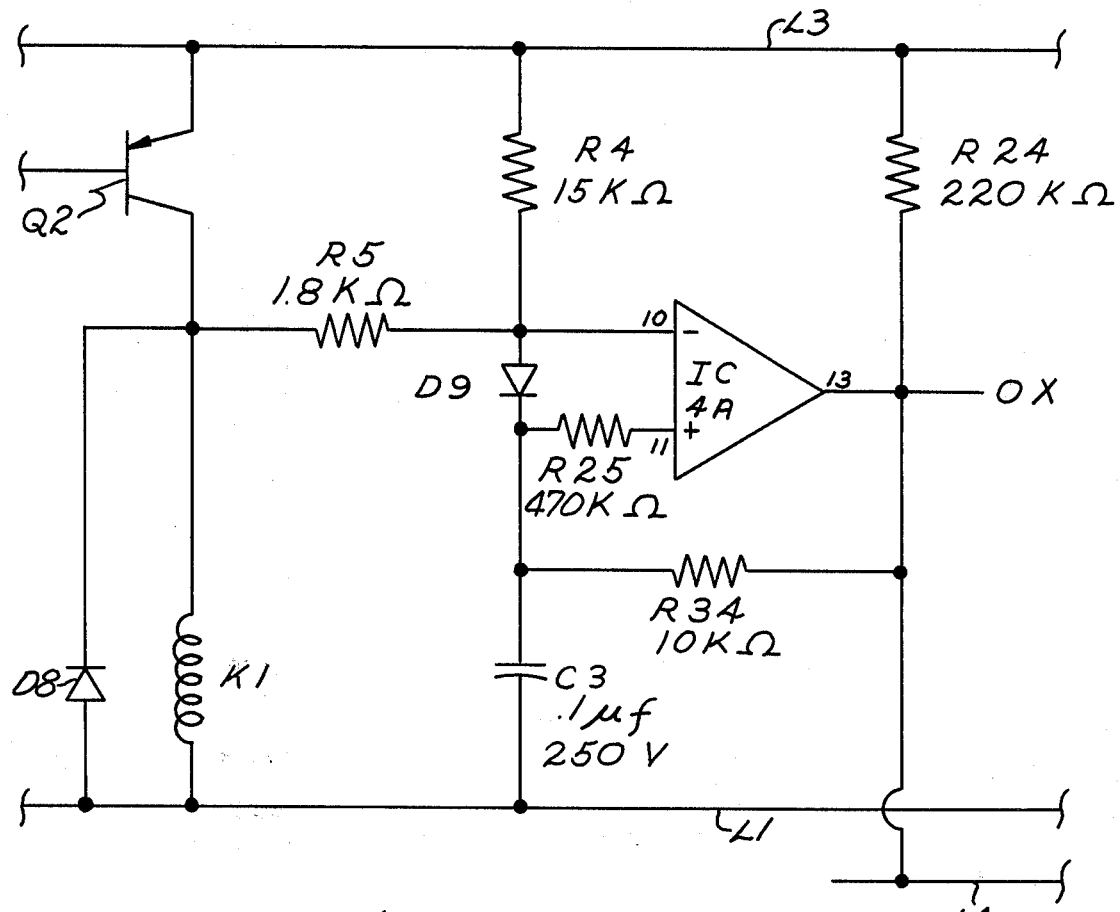
FIG. 2 is a schematic circuit diagram of a portion of the FIG. 1 circuit diagram modified to provide manual reset.

FIG. 2 shows a modification of the above system by changing it to a manual reset circuit. With this modification the system will lock-out any time the output trips. Following a trip, triac Q3 cannot be turned on until power to the system is removed and then reapplied. Lock out is accomplished by providing positive feedback resistor R34 from the output pin 13 of comparator IC4A to one of its input pins, pin 11 shown in FIG. 2. As long as power is applied capacitor C3 will remain charged and hold pin 11 positive with respect to pin 10. This keeps the output of comparator IC4A high which is fed back to temperature protection circuit 22 to lockout the triac output. When power is removed capacitor C3 discharges and allows the system to be reset when power is reapplied.

Although the invention has been described with regard to specific preferred embodiments thereof, many variations and modifications will become apparent to those skilled in the art. It is therefore the intention that the appended claims be interpreted as broadly as possible in view of the prior art to include all such variations and modifications.

We claim:

1. A protection system for a dynamoelectric machine comprising
   a source of power and switching means for switching the power to and from the dynamoelectric machine,
   a first control means, the first control means being a temperature protection control means having at least one input and an output and two operating states, temperature responsive sensor means coupled to one input of the first control means,
   a second control means, the second control means being a shorted sensor control means having at least one input and an output and two operating states, the output of the second control means coupled to the switching means, the output of the first control means coupled to the one input of the second control means,
   a third control means, the third control means being a time delay control means having at least one input and an output and two operating states, the output of the third control means coupled to the one input of the first control means, a timing network coupled to the one input of the third control means,
   a fourth control means, the fourth control means being a low voltage control means having at least one input and an output and two operating states, line voltage sensing means coupled to the one input of the fourth control means,
   a fifth control means, the fifth control means being a pressure control means having at least one input and an output and two operating states, the output of the fifth control means coupled to the one input of the first control means, a pressure switch network coupled to the one input of the fifth control means,
   sixth control means having at least one input and an output and two operating states, the output of the fifth control means coupled to the one input of the sixth control means, the output of the sixth control means coupled to the one input of the second control means,
   seventh control means having at least one input and an output and two operating states, the output of the seventh control means coupled to the one input of the sixth control means, dynamoelectric machine current sensing means having an output signal indicative of the existence of such current, the signal fed into the one input of the seventh control means, and eighth control means having at least one input and an output and two operating states, the output of the seventh control means coupled to the one input of the eighth control means and the output of the eighth control means coupled to the one input of the second control means.

2. A protection system for a dynamoelectric machine according to claim 1 in which the temperature protection control means comprises a first voltage comparator having two inputs and an output, the temperature responsive means comprises a voltage divider connected between a d.c. power source and common, including a reference resistor and a PTC resistor forming a first junction therebetween, the first junction connected to one input of the first comparator, means for providing a reference voltage and means for connecting the reference voltage to the other input of the first comparator.

3. A protection system for a dynamoelectric machine according to claim 2 in which the shorted sensor control means comprises a second voltage comparator having two inputs and an output, a second voltage divider connected between the d.c. power source and common comprising two resistors forming a second junction therebetween, the second junction connected to one input of the second comparator, a diode having an anode and a cathode, its anode connected to the second junction and its cathode connected to the first junction, means for providing a second reference voltage and means for connecting the second reference voltage to the other input of the second comparator.

4. A protection system for a dynamoelectric machine according to claim 3 in which the first resistor of the second voltage divider comprises two serially connected resistors forming a junction therebetween, the junction between the two serially connected resistors connected to the output of the first voltage comparator, and a feedback resistor, the feedback resistor connected between the output of the first voltage comparator and the said one input.

5. A protection system for a dynamoelectric machine according to claim 3 including transient protection comprising a first varistor connected between the first junction and common and a second varistor connected between the second junction and common.

6. A protection system for a dynamoelectric machine according to claim 3 in which the switching means includes a PNP transistor having a base and an emitter, collector circuit, the base coupled to the output of the second comparator, the emitter, collector circuit connected to a source of power whereby the transistor will conduct current when the second comparator is in one of its operating states and will not conduct current when the second comparator is in the other of its operating states.

7. A protection system for a dynamoelectric machine according to claim 6 in which the power supplied to the machine is electrically isolated from the protection system circuitry, the switching means further comprising a reed delay having a coil and contacts operably associated therewith, the coil serially connected to the emitter, collector circuit of the transistor, a triac having first and second anodes and a gate circuit, the anodes of the triac connected to the source of power and the machine and the contacts of the reed relay connected to a gate circuit of the triac.

8. A protection system for a dynamoelectric machine according to claim 7 in which the time delay control means comprises a third voltage comparator having two inputs and an output, a third voltage divider connected between the d.c. power source and common comprising two resistors forming a third junction therebetween, a diode, the inputs of the third voltage comparator connected to the third junction with the diode interposed therebetween, a resistor connecting one input of the third voltage comparator with the collector of the PNP transistor, a capacitor connected across one of the two resistors of the third divider between the third junction and common, the output of the third voltage comparator coupled to the said one input of the first voltage comparator.

9. A protection system for a dynamoelectric machine according to claim 3 in which the pressure control means comprises a fifth voltage comparator having two inputs and an output, a resistor connected between the d.c. source of power and said one input of the fifth voltage comparator, the said one input also connected to common through a serially connected diode and capacitor, normally open pressure switch contacts connected between the capacitor and common, the capacitor also coupled to the output of the first voltage comparator and means providing a reference voltage connected to the second input of the fifth voltage comparator, the output of the fifth voltage comparator coupled to the said one input of the first voltage comparator, the sixth control means comprising a sixth voltage comparator having two inputs and an output, the output of the fifth comparator connected to an input of the sixth comparator, the output of the sixth comparator connected to common through the pressure switch contacts.

10. A protection system for a dynamoelectric machine according to claim 9 in which normally open, push button contacts are connected between common and the fifth pressure control capacitor.

11. A protection system for a dynamoelectric machine according to claim 3 in which the low voltage control means comprises a fourth voltage comparator having two inputs and an output, a fourth voltage divider serially connected to a resistor between the power source and common comprising two resistors forming a fourth junction therebetween, the fourth junction connected to one input of the fourth voltage comparator, a capacitor connected across the fourth voltage divider.

12. A protection system for a dynamoelectric machine according to claim 9 in which the seventh control means comprises a seventh voltage comparator having two inputs and an output, a coil connected between two resistors which in turn are connected between the d.c. power source and common, the two inputs of the seventh voltage comprator connected to opposite ends of the coil, means electromagnetically coupling a power line carrying power to the machine to the coil, the eighth control means comprising an eighth voltage comparator having two inputs and an output, the output of the seventh voltage comparator coupled through a capacitor to an input of the eighth voltage comparator and to an input of the sixth voltage comparator, and the output of the eighth voltage comparator coupled to an input of the second voltage comparator.

13. A protection system for a deynamoelectric machine comprising a source of power and switching means for switching the power to and from the dynamoelectric machine, control means adapted to control the switching mmeans comprising first and second voltage comparators each having two inputs and an output, a source of d.c. power, a first voltage divider connected between the d.c. power source and common comprising a reference resistor and a temperature dependent resistor forming a first junction therebetween, the first junction connected to one input of the first comparator, a second voltage divider ccomprising two resistors forming a second junction therebetween, the second voltage divider serially connected to another resistance, the voltage divider and the said another resistor connected between the d.c. power source and common, the second junction connected to one input of the second comparator, reference voltage means connected to the other inputs of the first and second comparators, a diode coupled between the first and second junctions, the output of first comparator connected to a point between the second voltage divider and the said another resistance, so that upon a selected change in temperature and concomitant change in resistance of the temperature dependent resistor or upon shorting of the temperature dependent resistor, the output of the second comparator will switch and cause the switching means to interrupt power to the machine.

14. A protection system for a dynamoelectric machine comprising switching means for switching a source of power to and from the machine, a bridge circuit means controlling operation of the switching means, the bridge circuit means including a resistor bridge, the resistor bridge including a temperature dependent resistor responsive to a predetermined temperature condition, trigger means responsive to an unbalance of the bridge to operate the switching means, a time delay means having a time delay voltage comparator with two inputs and one output, a time delay voltage divider comprising two resistors forming a time delay junction therebetween, a diode, the inputs of the time delay voltage comparator connected to the time delay junction with the diode interposed therebetween, a capacitor connected across one of the two resistors of the time delay voltage dividers and the output of the time delay comparator coupled to the trigger means.

15. A protection system for a dynamoelectric machine comprising switching means for switching a source of power to and from the machine, a bridge circuit means controlling operation of the switching means, the bridge circuit means including a resistor bridge, the resistor bridge including a temperature dependent resistor responsive to a predetermined temperature condition, trigger means responsive to an unbalance of the bridge to operate the switching means, manual reset means having a manual reset voltage comparator with two inputs and an output, a diode connected between the two inputs of the manual reset voltage comparator, one input of the manual reset comparator connected through a resistor to a power source and to another resistor to the trigger means, the second input of the manual reset comparator connected to common through a capacitor and to the output of the manual reset comparator through a resistance, the ouput of the manual reset comparator coupled to the trigger means.

16. A protection system for a dynamoelectric machine according to claim 15 further including pressure control means comprising a pressure control voltage comparator having two inputs and an output, a resistor connected between a source of power and one input of the pressure control comparator, the said one input also connected to common through a serially connected diode and capacitor, normally open pressure switch contacts connected between the capacitor and common, the capacitor also coupled to the trigger means, the output of the pressure control comparator connected to the junction formed between the temperature dependent resistor and the reference resistor.

17. A protection system for a dynamoelectric machine according to claim 16 further including normally open, push button contacts connected between the pressure control capacitor and common.

18. A protection system for a dynamoelectric machine according to claim 15 further including low voltage control means comprising a low voltage comparator having two inputs and an output, a low voltage, voltage divider serially connected to a resistor between a power source and common comprising two resistors forming a first low voltage junction therebetween, the low voltage junction connected to one input of the first low voltage comparator, a capacitor connected across the low voltage divider, the output of the low voltage comparator coupled to the trigger means.

19. A protection system for a dynamoelectric machine comprising switching means for switching a source of power to and from the machine, a bridge circuit means controlling operation of the switching means, the bridge circuit means including a resistor bridge, the resistor bridge including a junction formed between a temperature dependent resistor responsive to a predetermined temperature condition and a reference resistor, trigger means responsive to an unbalance of the bridge to operate the switching means, output sensing control means comprising first and second output sensing voltage comparators each having two inputs and an output, á coil connected between two resistors which are in turn connected between a power source aand common, the two inputs of the first output sensing comparator connected to opposite ends of the coil, a power line carrying power to the machine disposed about the coil to form at least a single turn thereabout, the output of the first output sensing comparator connected through a capacitor to an input of the second output sensing comparator, the output of the second output sensing comparator coupled to the trigger means.

20. A protection system for a dynamoelectric machine according to claim 19 further including pressure control means comprising a pressure control voltage comparator having two inputs and an output, a resistor connected between the source of power and one input of the pressure control comparator, the said one input also connected to common through a serially connected diode and capacitor, normally open pressure switch contacts connected between the capacitor and common, the capacitor also coupled to the trigger means, the output of the pressure control comparator coupled to the trigger means.

21. A protection system for a dynamoelectric machine which has a power supply, a solid state power switch adapted to energize the machine, the power switch having a control element, contacts adapted to move into and out of engagement connected to the control element, electromagnetic coil means coupled to the contacts to control their position, and a control current switch to control the engergization of the electromagnetic coil means comprising a temperature control network including a voltage comparator having two inputs and an output, at least one temperature dependent resistor adapted to provide a signal to one of the inputs of the temperature control comparator indicative of the temperature of the temperature dependent resistor, a shorted sensor control network including a shorted sensor voltage comparator having two inputs and an output, the output of the shorted sensor control comparator determining the state of energization of the control current switch, the output of the temperature control comparator coupled to one of the inputs of the shorted sensor comparator and adapted to control its output state so that subjection of the sensor to a preselected temperature will cause the temperature control comparator to switch from one state to another which will in turn cause the shorted sensor comparator to switch from one state to another deenergizing the control current switch and deenergizing the electromagnetic coil means so that the contacts move out of engagement to deenergize the power switch and the machine.

22. A protection system according to claim 21 in which the temperature dependent resistor is also coupled to the said one input of the shorted sensor comparator so that a short circuit across the temperature dependent resistor will cause the shorted sensor comparator to switch to the said another state.

23. A protection system according to claim 22 further comprising a minimum off time delay network including an off time delay voltage comparator having two inputs and an output, an RC network coupled to one of the two inputs of the off time delay comparator the other input of the time delay comparator coupled to the control current switch and the output of the off time delay comparator coupled to said one input of the temperature control comaparator so that deenergization of the control current switch will cause the time delay comparator to switch from one state to another which signal will be fed to the said one input of the temperature control comparator maintaining the output of the temperature control comparator in the said another state for a selected period of time while the RC network discharges.

24. A protection system according to claim 23 further comprising a low voltage control network including a low voltage comparator having two inputs and an output, one of the inputs of the low voltage comparator coupled to the power supply, the output of the low voltage comparator coupled to the output of the temperature control comparator so that upon the occurrence of a voltage level in the power supply lower than a selected level the low voltage comparator will switch from one state to another which signal will be fed to the output of the temperature control comparator.

25. A protection system according to claim 24 further comprising a pressure protection network including first and second pressure protection voltage comparators each having first and second inputs and an output, a pressure protection timing capacitor coupled to one of the inputs of the first pressure protection comparator, a discharge path coupled to the timing capacitor which includes pressure switch contacts, the output of the pressure protection comparator coupled to the said one input of the shorted sensor comparator so that if a pressure switch bridges the pressure switch contacts before the timing capacitor reaches a selected charge level which causes the first pressure protection comparator to switch the timing capacitor will be discharged, however, if the timing capacitor reaches the selected charge level the output of the first pressure protection comparator will switch from one state to another which will cause the shorted sensor comparator to switch to its said another state.

26. A protection system according to claim 25 further comprising an output sensing network including first and second output sensing voltage comparators each having first and second inputs and an output, the output of the second output sensing comparator coupled to the said one input of the shorted sensor comparator, a coil connected across the first and second inputs of the first output sensing comparator, a portion of a power supply line serially connected to a control electromagnetically coupled to the coil so that during normal operation the output of the first output sensing comparator will continuously switch back and forth from one state to another whereas if no current flows in the said portion of the power supply line then the first output sensing comparator will be maintained in said one state, a first output sensing capacitor coupled to the output of the first output sensing comparator, a second output sensing capacitor connected between the output of the first output sensing comparator and one input of the second output sensing comparator so that a short pulse is fed to the said one input of the second output sensing comparator when the first output sensing capacitor is sufficiently charged causing the output of the second output sensing comparator to switch from one state to another which is fed to the said one input of the shorted sensor comparator.

27. A system for a dynamoelectric machine comprising switching means for switching a source of power to and from the machine,
  a bridge circuit means controlling operation of the switching means,
  trigger means responsive to an unbalance of the bridge to operate the switching means,
  a time delay means having a time delay voltage comparator with two inputs and one output, a time delay voltage divider comprising two resistors forming a time delay junction therebetween, a diode, the inputs of the time delay voltage comparator connected to the time delay junction with the diode interposed therebetween, a capacitor connected across one of the two resistors of the time delay voltage dividers and the output of the time delay comparator coupled to the trigger means.

28. A protection system according to claim 27 further comprising a resistor, one end of the resistor connected intermediate the capacitor and the diode, and the other end of the resistor connected to one of the inputs of the time delay voltage comparator.

* * * * *